No. 663,722. Patented Dec. 11, 1900.
G. H. BROCK.
MUSICAL CHART.
(Application filed Apr. 29, 1899.)
(No Model.) 2 Sheets—Sheet 1.
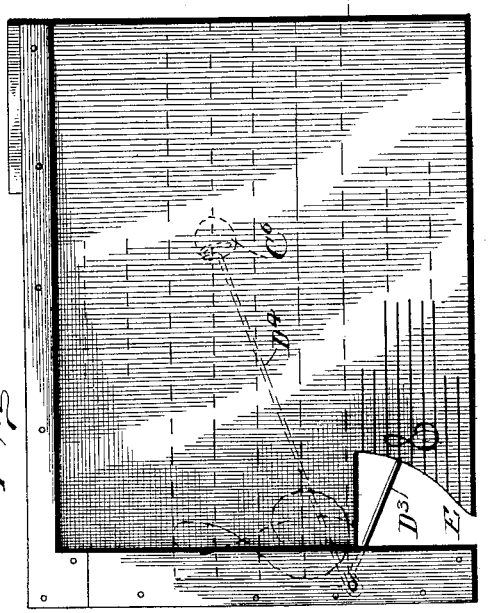
Fig. 4.
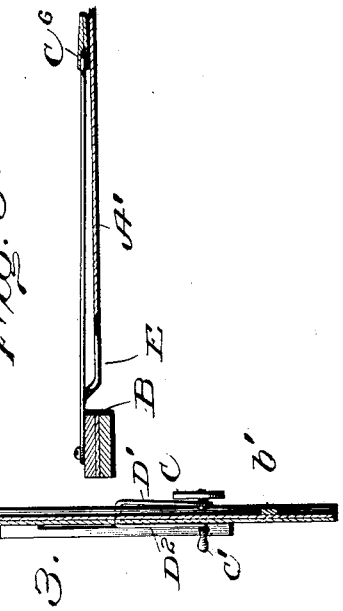
Fig. 5.
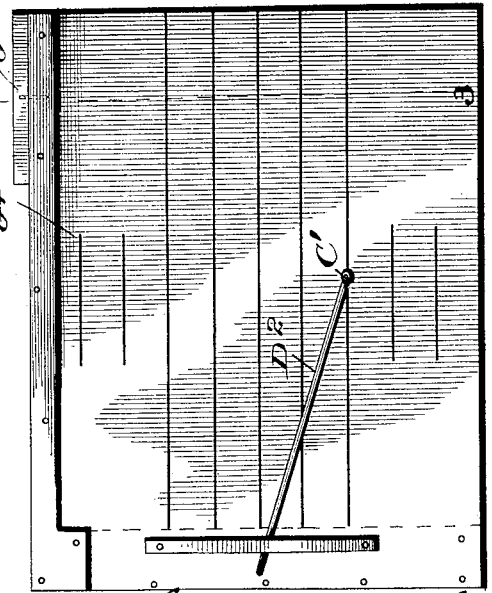
Fig. 3.
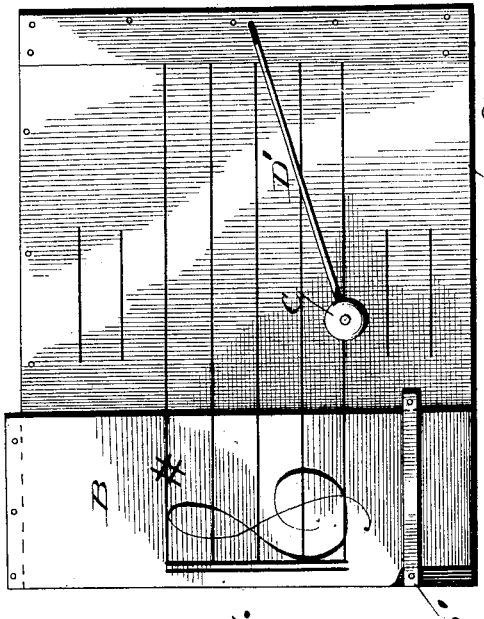
Fig. 1.
Fig. 2.
Witnesses
Inventor
George H. Brock No. 663,722. Patented Dec. 11, 1900.
G. H. BROCK.
MUSICAL CHART.
(Application filed Apr. 29, 1899.)
(No Model.) 2 Sheets—Sheet 2.
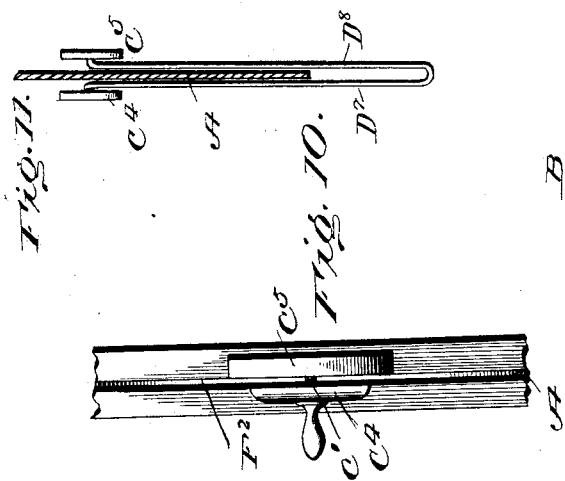
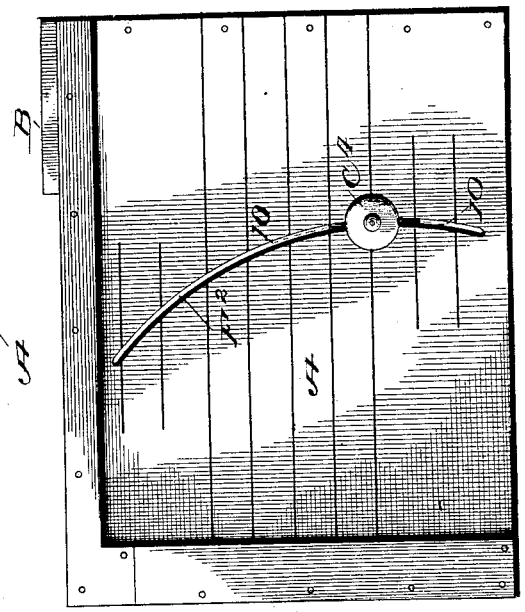
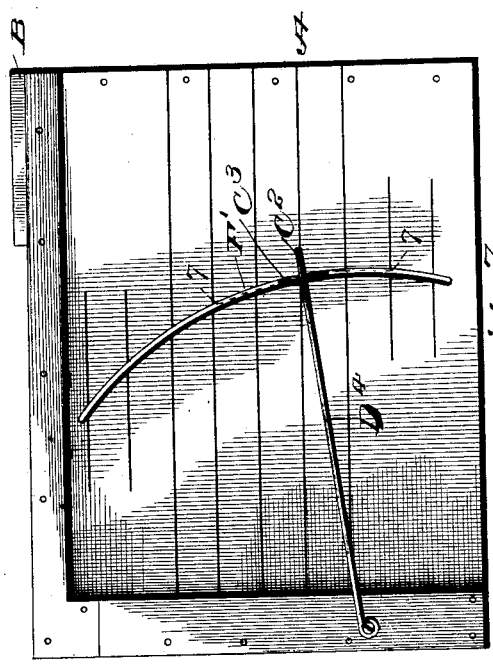
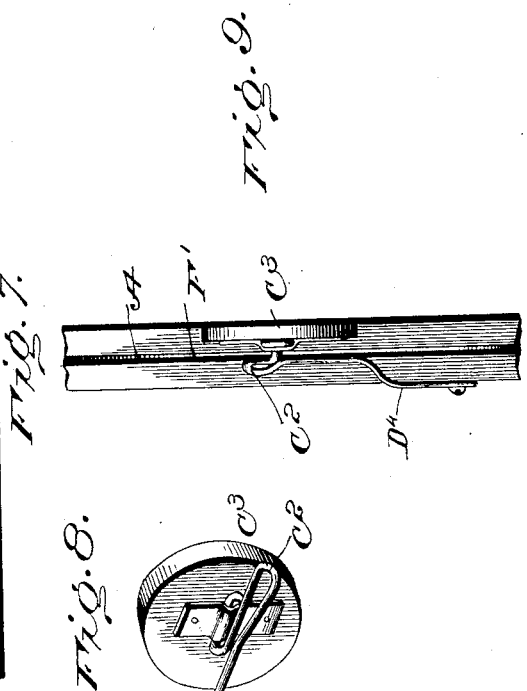
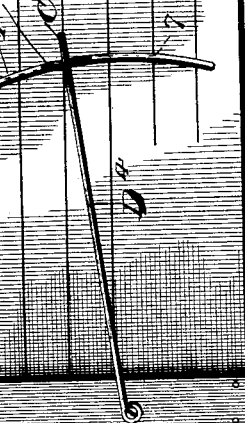
Witnesses
Inventor
George H. Brock

UNITED STATES PATENT OFFICE.

GEORGE H. BROCK, OF HUNTINGTON, NEW YORK.

MUSICAL CHART.

SPECIFICATION forming part of Letters Patent No. 663,722, dated December 11, 1900.

Application filed April 29, 1899. Serial No. 715,017. (No model.)

*To all whom it may concern:*

Be it known that I, GEORGE H. BROCK, a citizen of the United States, residing at Huntington, in the county of Suffolk and State of New York, have invented certain new and useful Improvements in Musical Charts; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to music-charts; and it consists in a device for readily and conveniently teaching sight-reading, such as will be hereinafter fully described and claimed.

In the drawings, Figure 1 represents a view in elevation of a chart embodying one form of my invention, while Fig. 2 shows the reverse side of the same chart. Fig. 3 is a vertical sectional view of the chart on the line 3 3 of Fig. 2. Figs. 4 and 5 are respectively a rear elevation and a horizontal sectional view of a modified chart. Fig. 6 is a part elevation of a second modification, Figs. 7 and 8 being further views of the same device. Figs. 9 and 10 are views of a third modification. Fig. 11 shows a fourth modification.

Referring to Figs. 1, 2, and 3, the letter A indicates a chart which is provided upon both sides with like staffs of the same or of different sizes. B is a removable signature-card bearing upon its face an ordinary key-signature. To represent a different key, the signature-card is to be changed. This signature-card is suspended at its upper end by a pin $b$, affixed to the card and loosely inserted into a socket at the top of the chart, and at its lower end is secured by a strap $b'$, behind which said lower end may freely pass.

Upon that side of the chart which is to be observed by the pupils is a movable note-representer C, which is suitably connected with another note-representer C' upon the other side of the chart. The two note-representers are united by connected wire arms D' D², arranged upon opposite sides of the chart, said arms being arranged to swing upon a bearing in the body of the chart, so that the said note-representers will move together and occupy corresponding positions with reference to the oppositely-disposed staffs to represent a musical note and its position on, above, or below the staff.

By observing the movements of the note-representer upon his side of the chart the instructor can determine the position of the note-representer upon the side which the pupils are reading and by changing the positions of these elements lead or instruct the class at will.

In Figs. 4 and 5 one of the note-representers may be dispensed with and an indicator-arm $D^3$ employed, said indicator-arm being connected with the arm $D^4$, which carries the note-representer $C^6$, and both arms arranged and pivoted upon one and the same side of the chart. In order that the instructor may be able to determine the position of the note-representer upon the side of the chart facing the persons reading, the chart is cut away at E to permit free observation and manipulation of the indicator-arm by the instructor.

In Figs. 6, 7, and 8 a form of device is shown in which both note-representers $C^2$ $C^3$ are mounted upon a single pivoted arm $D^5$. In this construction the arm is bent into a loop to form one of the note-representers $C^2$ and carries the other note-representer $C^3$ at its extremity, which extremity extends through a slot $F'$ in the chart.

As shown in Figs. 9 and 10, the two note-representers may be in the form of buttons $C^4$ $C^5$, said buttons being united by a stem $c'$, extending through the slot $F^2$ in the chart, or the note-representers may be supported by arms that are not pivoted to the card, in which instance a U-shaped wire is made to straddle the chart, so as to bring the note-representers, carried by arms $D^7$ $D^8$, upon opposite sides thereof.

The chart may be solid with lines ruled upon its opposite sides or portions may be cut out so as to represent the lines of the staff.

Having thus fully described my invention, what I claim as new, and desire to secure by Letters Patent, is—

1. The combination of a musical chart having similar plain staffs upon opposite sides thereof, a single movable note-representer adapted to be moved over the chart, on one side thereof, to indicate the position of a note, the path of said note being substantially coextensive with the vertical height of the staff, and means for indicating upon the other side of said chart the position of the note-representer.

2. The combination of a musical chart having plain staffs upon opposite sides thereof, and two note-representers, one upon each side of the chart, the two arranged to move in unison, one of said note-representers adapted to be moved over one side of the chart to represent a note on, above, or below the staff and the other to indicate the position of said note on the opposite side of said chart, the path of movement of said note-representers being substantially coextensive with the vertical height of said staffs.

3. The combination of a musical chart having plain staffs upon opposite sides thereof, united note-representers adapted to be moved in unison over the chart to indicate the position of a note on, above, or below the staffs, the path of movement of each note-representer being substantially coextensive with the height of its respective staff, and a removable signature-card, substantially as specified.

4. The combination of a slotted musical chart having staffs upon its opposite sides, and note-representers, for said staffs, united by a stem extending through the slot of the chart, substantially as specified.

5. The combination of a musical chart with similar plain staffs upon each side thereof, a movable note-representer upon one side of the chart, and means upon the other side for moving the note-representer to a position on, above, or below the staff, to represent the position of a note indicated upon the opposite side.

In testimony whereof I have affixed my signature in presence of two witnesses.

GEORGE H. BROCK.

Witnesses:
HERMAN F. ROGERS,
ALLISON E. LOWNDES.